Patented Jan. 5, 1937

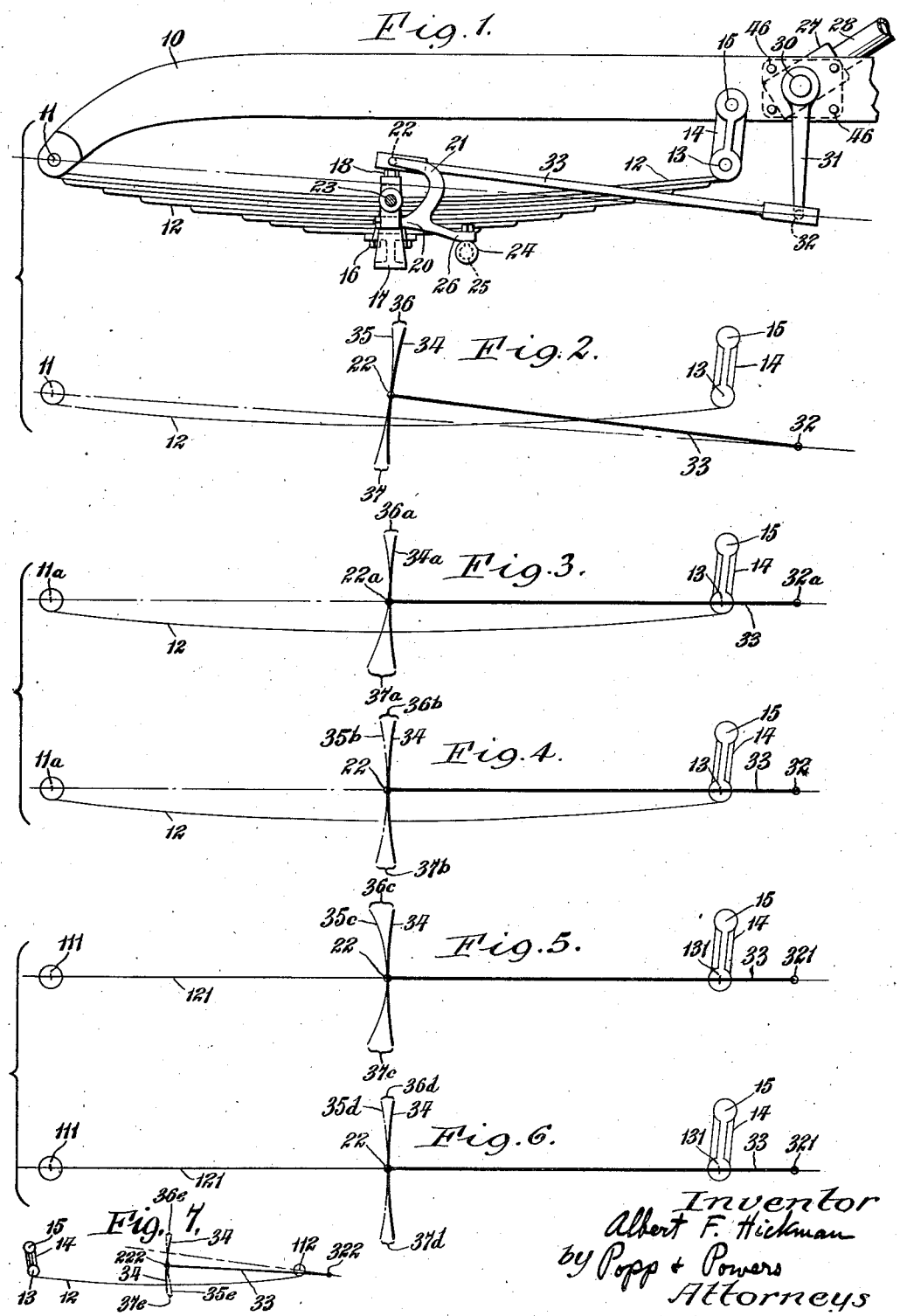

2,066,350

UNITED STATES PATENT OFFICE 2,066,350

CONTROL LINKAGE FOR VEHICLES

Albert F. Hickman, Eden, N. Y., assignor to Hickman Pneumatic Seat Co., Inc., Eden, N. Y., a corporation of New York Application May 7, 1932, Serial No. 609,961

8 Claims. (Cl. 280—95)

This invention relates to a control linkage for vehicles, and more particularly to a steering linkage for connecting the manual steering wheel of an automobile to the front or steering ground wheels thereof, so as to enable the automobile to be steered when said manual steering wheel is moved in the one or other direction.

The principal object of the invention is to enable said front or steering wheels to be steered by turning the steering wheel, but substantially preventing any lateral turning of the steering wheels as a consequence of the vertical movement of the front axle relatively to the vehicle frame. Numerous other objects of the invention and practical solutions thereof are disclosed in detail in the herein patent specification wherein:

In the accompanying drawing:

Figure 1 is a fragmentary, vertical, longitudinal section through the front end of an automobile chassis, illustrating the invention as applied to the steering apparatus of an automobile having a cambered spring.

Figure 2 is a similar view but shown diagrammatically, and also showing the actual and the unhampered path of the steering knuckle pivot.

Figure 3 is a diagrammatic representation of the actual and the unhampered movement of the knuckle pivot of a conventional set-up with a cambered spring.

Figure 4 is a diagrammatic representation of the theoretical action of a conventional set-up with a cambered spring.

Figure 5 is a diagrammatic representation of the actual action of the knuckle pivot with a conventional set-up for a spring having a zero camber.

Figure 6 is a diagrammatic representation of the theoretical action of a conventional set-up for a zero camber spring.

Figure 7 is a diagrammatic representation of a modified form of the invention as applied to a cambered spring.

In the following description similar characters of reference indicate like parts in the several figures of the drawing.

My invention may be embodied in various forms and in control linkages of different constructions, and the present application is therefore to be regarded as merely one organization which satisfactorily carries out the invention in practice. As here shown the same is constructed as follows:

To the main frame 10 of the vehicle is pivoted at 11 the front end of a conventional, cambered, semi-elliptic leaf spring 12, which, as illustrated in Fig. 1, has a camber, i. e., when under normal pressure, it is of curved form between its front or fixed pivot 11 and its rear or shackle pivot 13. The latter pivot is disposed at the lower portion of a conventional shackle 14 which is pivoted at its upper end at 15 to the main frame 10 of the vehicle. The function of this shackle is to permit the main leaf spring 12 to freely flatten out when subjected to loads which are greater or less than normal.

Secured by front axle bolts 16 or otherwise to the central or thick part of said front springs 12 is a conventional front axle 17 of the usual I beam type. This axle is bent upwardly at each of its outer ends in the conventional manner and is pivotally connected by a king pin or steering spindle 18 to the conventional control member or steering knuckle 20 which is preferably of the Ellicott type and is provided with a curvilinear control or steering arm 21, at the outer (upper, front) end of which is disposed a control or knuckle pivot 22. As per customary practice, this knuckle pivot 22 lies in substantially the same vertical, transverse plane as the axis of the steering spindle 18 when the vehicle is moving in a straight-ahead direction. Steering of the front wheels to the right or left is effected by a horizontal and substantially longitudinal movement of said knuckle pivot 22 about its axis of rotation, namely, the steering spindle 18.

It is, of course, necessary to move this knuckle pivot 22 forwardly or rearwardly to effect steering of the vehicle, but it is not desired that such a longitudinal movement be caused as a consequence of the vertical movement of the axle 17 relatively to the frame 10. To prevent this latter, non-desirable action is the object of the present invention.

In accordance with standard automobile practice, the front axle 17 is provided with a knuckle 20 at each end, and upon each knuckle is rotatably mounted the usual front steering wheel (not shown) on a companion horizontal, outwardly projecting, stub axle 23. Partial rotatory movement of the one (left side) steering knuckle 20 (by reason of the actuation of its knuckle pivot 22) is simultaneously imparted to the other steering knuckle by the usual and well known manner by a horizontal, transverse steering rod 24 which is pivoted at opposite ends at 25 to the unifying arms 26 of the two steering knuckles 20.

Secured by bolts 46 or otherwise to the frame 10 of the vehicle is the usual steering box 27, which is actuated by the rotatable steering column or post 28 and is adapted to cause a partial rotation in the one or other direction of the steering-box, stub shaft 30, which is journaled in said steering box 27 and extends horizontally and laterally out beyond the outside face of the vehicle frame 10. Secured to said stub shaft 30 is an actuating arm 31 to the lower end of which is pivoted, by a ball and socket joint or actuating pivot 32, the rear end of a steering or drag link 33. This drag link 33 extends longitudinally forward of said actuating pivot 32 and is connected to the ball and socket joint or control pivot 22 aforedescribed.

We will now consider the action of this steering linkage when the vehicle is travelling along the roadway in a straight line without the operator manipulating the steering column or post 28. Under such conditions the actuating pivot 32 is fixed relatively to the frame 10, and the front pivot of the drag link (control pivot 22) is caused by the vertical movements of the axle 17 to swing in an arc 34 about the actuating pivot 32 as a center. Let us now consider the movement of the steering mechanism, which would take place as a consequence solely of vertical movement of the axle 17 resulting from the horizontal movement of the control pivot 22 when unhampered, except as to vertical axle movement, i. e., when disconnected from the drag link 33. If we take an actual set-up with a semi-elliptic front spring 12 having a two-inch camber, we find, as the axle 17 is moved to its extreme upward and downward positions, that the control pivot 22 tends to move along an unsymmetrical graph line 35, under these conditions, i. e., when said control pivot 22 is disconnected from the drag link 33. It is obvious, however, that, in actual practice, the path of said control pivot 22 is forced to travel the drag link arc 34. Hence it is clear that the steering linkage should be so designed that the graph line 35 coincides as nearly as possible with said drag link arc 34. To phrase the matter in a practical manner, it is highly desirable to have the distances 36 and 37 as small as possible and equal to each other. To accomplish this result in a manner which results in maximum efficiency and minimum shimmy of the front wheels, it has been found, (when the spring 12 has a camber) that the control pivot 22 should be located above the imaginary line 11—32. This relationship may also be expressed by stating that the actuating pivot 32 should be, and in the present invention is, located below the imaginary line connecting the spring pivot 11 with the control pivot 22. When this is properly done, the distances 36 and 37 have a minimum value and are equal to each other.

In Fig. 3 is shown what actually occurs in a steering linkage set-up of the conventional type. Here the control pivot 22a is located on the line 11a—32a when said control pivot is in its normal or central position, i. e., in the center of its maximum-swing, drag link arc 34a. When the various pivots are arranged in such a relationship, it is obvious by inspection that the distances 36a and 37a are not only much different from each other, but also that the distance 37a is considerably larger than either of the distances 36 or 37 (which are equal to each other). Fig. 4 illustrates the reason why the control pivot 22a has been placed where it is in the conventional set-up. It has been heretofore assumed that the control pivot 22 tends (if unhampered) to follow the symmetrical arc 35b (which has the spring pivot 11a as its center) when said control pivot 22 moves up and down with the front axle 17 with said control pivot 22 unhampered by the drag link 33. If we assume that this is true the distances 36b and 37b would, of course, be equal, but such a condition does not actually obtain, the real action of such a set-up being shown in Fig. 3.

Fig. 5 shows an actual, conventional set-up for a spring having a zero camber. Hence the unhampered movement of the control pivot 22 (disconnected from drag link 33) is shown by the graph 35c, which is a symmetrical curve, but is not an arc about the spring pivot 111 as a center, this result being due to the fact that, when spring flexure occurs, each half of the semi-elliptic spring is increasingly curved as the axle 17 is moved toward its extreme upper or lower positions and hence the distance of the control pivot 22 from the spring pivot 111 shortens in proportion to the vertical displacement of said axle 17. The theoretical basis upon which such a set-up with a zero camber spring is based is shown in Fig. 6, it being assumed that the control pivot 22 (when unhampered by drag link 33) swings about the graph line 35d having the spring pivot 111 as its center. Such a condition does not, however, actually obtain in practice.

To arrive at a correct conclusion as to the most efficient, steering-linkage set-up, it is necessary to disregard the theoretical designs of Figs. 4 and 6 and to compare only Figs. 2, 3, and 5. From such a comparison it clearly appears that not only does the present invention provide distances 36 and 37 which are very small in amount and are equal to each other, as compared with the conventional, cambered-spring set-up of Fig. 3, but is also superior to the conventional set-up with a zero cambered spring of Fig. 5. It is true that, in the latter case, the distances 36c and 37c are equal, but both are larger than either of the equal distances 36 and 37 of Fig. 2, and hence this zero cambered set-up of Fig. 5 is inferior to the improved cambered spring set-up of Fig. 2.

From the foregoing analysis the following practical conclusions are derived: A. That the control pivot 22 should be located above the line 11—32, and B. That the benefits of such a relationship are greatest when the spring 12 is cambered instead of flat.

It is obvious to those skilled in the art that these same geometric considerations apply not only to steering linkage but also to the mechanical linkage for actuating mechanical brakes, controlling the pressure of shock absorbers, snubbers, etc.

In the spring and steering linkage thus far described, the leaf spring 12 has been pivoted at its forward end at 11 and shackled at its rear end on shackle 14, while the actuating pivot (relatively-fixed drag link pivot) 32 has been located rearwardly of the knuckle pivot 22 which constitutes the front or floating pivot of the drag link 33. It is obvious that if this entire arrangement is reversed there results no change in the geometric relationship of the various parts relatively to each other. In other words, if the floating spring pivot 13 and the actuating pivot 32 were both located adjacent the front end of the spring 12, then the best position for the knuckle pivot 22 would be, as before, above the imaginary line 11—32.

A different condition of affairs, however, results if the actuating pivot 322 is situated adjacent the fixed spring pivot 112 as shown diagrammatically in Fig. 7. It is true that the same condition of affairs in general obtains with such an arrangement as in Figs. 1–6. It will be noted, however, that the knuckle pivot 222 is located below the theoretical line 112—322, whereas in Fig. 2, for instance, the knuckle pivot 22 is located above the imaginary line 11—32. Nevertheless in this form of the invention, just as in the construction which is diagrammatically shown in Fig. 2, the actuating pivot (322) is located below the imaginary line connecting the spring pivot (112) with the control pivot (222). In the construction of Fig. 7, the heavy line 34, as before, represents the true path of the knuckle pivot 222 which is compelled to move in an arc about the actuating pivot 322 as a center. The theoretical line 35e, on the other hand, represents the path that would be followed (as the axle rises and falls) if this pivot were rigidly connected to the axle and disconnected from the drag link 33. The distances 36e and 37e are then a measure of the amount the steering ground wheels are turned to the left or right due to vertical axle movement and these distances are seen to be very small and equal in amount, precisely as in Fig. 2.

I claim:

1. A control linkage associated with the frame and axle of a vehicle and comprising: a spring connected to said axle and pivoted at its front end to said frame; an actuating arm arranged rearwardly of said spring and movably arranged on said frame and having an actuating pivot; a control member movably arranged on said axle having a control pivot; and a drag link pivoted at opposite ends to said actuating pivot and said control pivot, the normal position of said control pivot being above a line joining the spring pivot with the actuating pivot.

2. A control linkage associated with the frame and axle of a vehicle and comprisng: a spring connected to said axle and pivoted at its front end to said frame; an actuating arm arranged rearwardly of said spring and movably arranged on said frame and having an actuating pivot; a control member movably arranged on said axle and having a control pivot; and a drag link pivoted at opposite ends to said actuating pivot and said control pivot, the central position of said control pivot being above a line joining the spring pivot with the actuating pivot.

3. A control linkage associated with the frame of a vehicle and comprising: a spring pivoted at one end to said frame; an actuating arm movably connected with said frame adjacent the opposite end of said spring and having an actuating pivot; an axle secured to said spring; a knuckle pivoted on said axle and having a knuckle pivot; and a drag link pivoted at opposite ends to said knuckle pivot and to said actuating pivot, the position of said knuckle pivot being above an imaginary line connecting the spring pivot with the actuating pivot when the linkage is in its normal position.

4. A control linkage associated with the frame and axle of a vehicle and comprising: a spring connected to said axle and directly pivoted at its one end by a spring pivot to said frame; an actuating pivot arranged beyond the other end of said spring; means for moving said actuating pivot relatively to said frame so as to effect steering of the vehicle; a control member movably arranged on said axle and having a control pivot; and a drag link pivoted at opposite ends to said actuating pivot and said control pivot, the normal position of said control pivot being above a line joining the spring pivot with the actuating pivot.

5. A control linkage associated with the frame and axle of a vehicle and comprising: a spring connected to said axle and directly pivoted at its one end by a spring pivot to said frame and shackled at its other end to said frame; an actuating pivot arranged beyond the shackled end of said spring; means for moving said actuating pivot relatively to said frame so as to effect steering of the vehicle; a control member movably arranged on said axle and having a control pivot; and a drag link pivoted at opposite ends to said actuating pivot and said control pivot, the normal position of said control pivot being above a line joining the spring pivot with the actuating pivot.

6. A control linkage associated with the frame and axle of a vehicle and comprising: a cambered spring connected to said axle and directly pivoted at its one end by a spring pivot to said frame; an actuating pivot arranged beyond the other end of said spring; means for moving said actuating pivot relatively to said frame so as to effect steering of the vehicle; a control member movably arranged on said axle and having a control pivot; and a drag link pivoted at opposite ends to said actuating pivot and said control pivot, the normal position of said control pivot being above a line joining the spring pivot with the actuating pivot.

7. A control linkage associated with the frame and axle of a vehicle and comprising: a cambered spring connected to said axle and directly pivoted by a spring pivot at its one end to said frame; an actuating pivot arranged beyond the other end of said spring; means for moving said actuating pivot relatively to said frame so as to effect steering of the vehicle; a control member movably arranged on said axle and having a control pivot; and a drag link pivoted at opposite ends to said actuating pivot and said control pivot, the normal position of said control pivot being above a line joining the spring pivot with the actuating pivot.

8. A control linkage associated with the frame and axle of a vehicle and comprising: a spring connected to said axle and directly pivoted at its one end by a spring pivot to said frame; movable means connecting the other end of said spring with the frame; a control member movably arranged on said axle and having a control pivot; an actuating pivot normally located below a line connecting said spring pivot with said control pivot; means for moving said actuating pivot relatively to said frame so as to effect steering of the vehicle; and a drag link pivoted at opposite ends to said actuating pivot and said control pivot.

ALBERT F. HICKMAN.